United States Patent [19]

Ongaro

[11] Patent Number: 4,655,080
[45] Date of Patent: Apr. 7, 1987

[54] DYNAMIC TIRE BALANCING MACHINE AND METHOD

[76] Inventor: Theodore Ongaro, c/o Ongaro Dynamics, Ltd., 939 King St., Columbus, Ohio 43212

[21] Appl. No.: 782,992

[22] Filed: Oct. 2, 1985

[51] Int. Cl.[4] ............................................. G01M 1/22
[52] U.S. Cl. ....................................... 73/462; 73/479
[58] Field of Search ................. 73/462, 473, 475, 476, 73/477, 479, 1 R, 1 B, 146

[56] References Cited

U.S. PATENT DOCUMENTS

| | | | |
|---|---|---|---|
| 3,412,615 | 11/1968 | Nedley | 73/146 |
| 3,862,570 | 1/1975 | Ongaro | 73/146 |
| 3,991,621 | 11/1976 | Armbruster | 73/479 |
| 4,366,707 | 1/1983 | Jarschel | 73/462 |
| 4,494,400 | 1/1985 | Hill | 73/462 |

*Primary Examiner*—Michael J. Tokar
*Assistant Examiner*—John E. Chapman, Jr.
*Attorney, Agent, or Firm*—Frost & Jacobs

[57] ABSTRACT

A tire balancing machine in which the tire is mounted on an axle which is pivotally mounted relative to a road wheel while maintaining the axis of rotation of the tire parallel to the axis of rotation of the road wheel, the tire being spring loaded against the road wheel to simulate the weight load borne by the tire in normal use and the road wheel driven at a speed to rotate the tire at its intended operating speed, sensors being provided to measure the magnitude and location of the horizontal and vertical asymmetrical forces developed at the tire patch, the force measurements being utilized to determine the location and amounts of weight to be applied to the wheel rim to offset the asymmetrical forces generated by the tire in use.

15 Claims, 4 Drawing Figures

DYNAMIC TIRE BALANCING MACHINE AND METHOD

This invention relates to the balancing of rubber tires, and has to do more particularly with a system for dynamically balancing the tires under conditions simulating those encountered by the tire when in use on a vehicle.

BACKGROUND OF THE INVENTION

A great amount of labor goes into the construction of a rubber tire. Layer after layer of various rubber compounds, fabrics, cords and steel wires are assembled in molds where they are compressed and heated under pressure to insure that the rubber will flow into the mold patterns and vulcanize to the proper resiliency. The final result is a varying amount of irregularities which differ from tire to tire.

After construction, the tires are mounted on wheels and then dynamically balanced by applying weights to the rim of the wheels, whereupon the balanced tires are mounted on a vehicle. It is a universally known fact that all tire balancing machines operate with the tire/wheel assembly in space, i.e., in an unloaded condition. The tire is never loaded during balancing to simulate the conditions which are encountered when the tire is in use. A tire balanced in conventional fashion is assumed to be geometrically true about its axis of rotation, which assumes that the tire in use will operate at a constant rolling radius. This is very seldom the case. Three types of asymmetrical conditions are ever present: (1) radial variations (geometrical irregularties), (2) asymmetrical structural distribution (rigidity variations), and (3) asymmetrical distribution of the mass (unbalance).

Tires are supported by the roadway in much the same manner as a track supports a railroad wheel, but the railroad wheel is made of steel and is inflexible for practical purposes. The perimeter of the railroad wheel is machined so as to be concentric with its axis of rotation and therefore contacts the rail at a constant loaded radius. Tires, on the other hand, are pneumatic annular envelopes intended to reduce shock while flexing at the footprint or tire patch, i.e., the area of the tire in contact with the roadway. A tire by reason of the nature of its construction is not symmetrical and therefore the balancing techniques utilized to balance a railroad wheel or an armature or a crankshaft are ineffective to properly balance a rubber tire. The vibratory reactions occurring within the tire, which depend upon the speed and load at which the tire is rotated, are particularly present on smooth roads due to the lack of peripheral uniformity of the tire. It is these vibratory centrifugal reactions which must be overcome if the tire is to operate at a quasi constant rolling radius.

SUMMARY OF THE INVENTION

In order to correctly balance a rubber tire it must be subjected to substantially the same environment it encounters in use, as where the tire travels down a highway at normal speed and supports the weight of the vehicle. In accordance with the present invention, this is accomplished by rotating the tire in a loaded state at realistic speeds, locating and measuring the various asymmetrical areas of the tire as they pass through the footprint at selected speeds, and counteracting the detected forces by applying weights to the wheel rim in amounts and at locations which will offset the asymmetrical forces generated by the tire. In this way the tire/wheel assembly can be balanced to operate like a railroad wheel, free from annoying and unsafe vibrations.

The balancing machine of the present invention comprises a road wheel adapted to be driven by a motor and a tire mounting system designed to maintain the tire and road wheel axles parallel despite vertical movement of the tire. The tire mounting system incorporates means to spring load the tire against the road wheel to simulate the weight load which will be borne by the tire in use as well as simulate the spring system of the vehicle which permits the wheel axle to move under the influence of asymmetrical forces.

The tire mounting system includes a set of sensors positioned to sense the horizontal forces generated by the tire, i.e., the tangential forces developed at the footprint of the tire due to lack of centrifugally loaded tire symmetry. An additional sensor is positioned to measure the vertically generated forces, i.e, the forces indicating lack of symmetry at the rolling footprint. An optical encoder of known construction is incorporated in the wheel supporting hub mounted on the wheel axle which provides the angular locations of the vibratory forces. The measurements taken by the sensors and encoder are preferably fed to a pre-programmed computer which analyzes the data and determines the correct amount and proper location at which to place the corrective weights needed to overcome the vibratory forces within the tire.

DESCRIPTION OF THE PREFERRED EMBODIMENT

Figure 1:
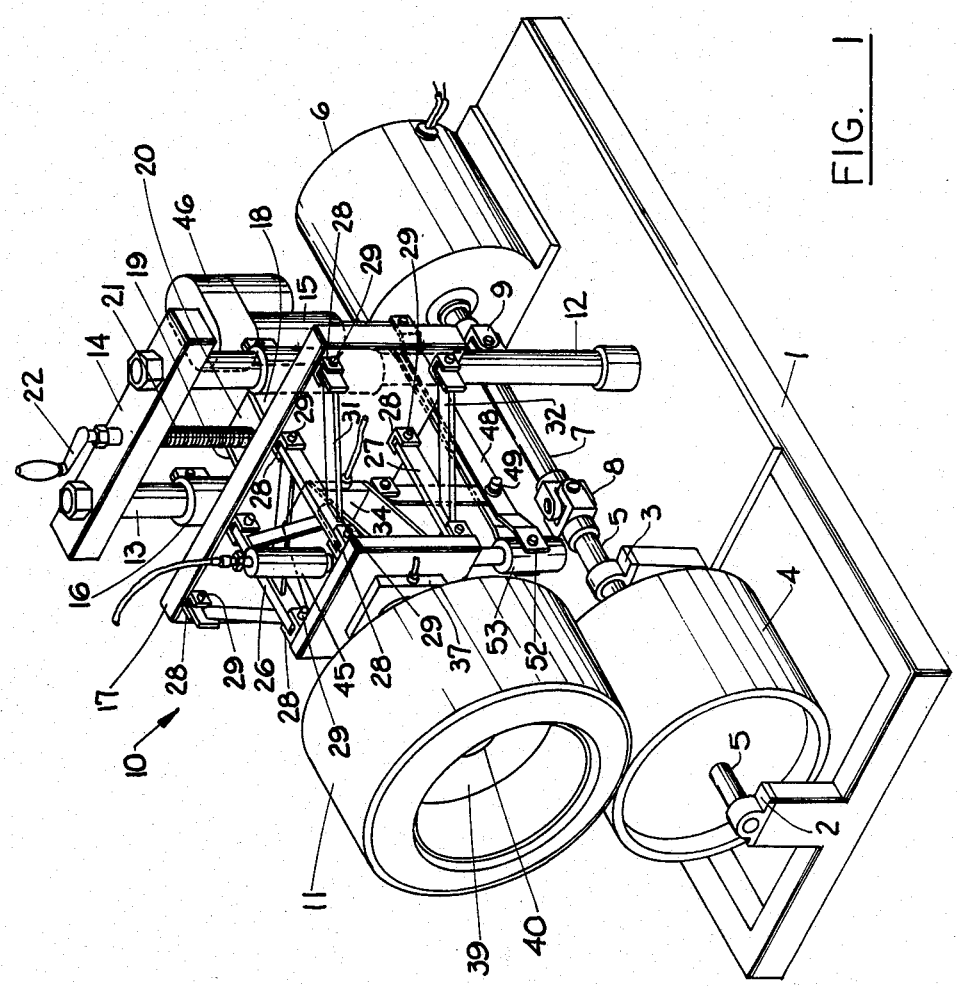
FIG. 1 is a perspective view of a tire balancing machine in accordance with the present invention.

Referring first to FIG. 1 of the drawings, the balancing machine comprises a main frame 1 having journals 2 and 3 which rotatably mount a road wheel 4 having an axle 5 adapted to be driven by a prime mover 6, which may comprise either an electric or an hydraulic motor, the prime mover driving the road wheel through a drive shaft 7 and universal joints 8, 9.

The tire mounting system, indicated generally at 10, mounts a tire 11 which, in the embodiment illustrated, comprises a racing tire. A pair of support posts 12, 13 extend vertically upwardly from the main frame 1, the support posts being interconnected at their uppermost ends by a bridge plate 14. The posts 12, 13 are surrounded by split quills 15, 16 which are slidable axially relative to the support posts, the quills mounting a vertically disposed support plate 17 from which the tire 11 is suspended in a manner to be described hereinafter.

A pair of arms 18, 19 project rearwardly from the support plate 17 between the support posts 12, 13, the arms 18, 19 mounting a block 20 having a threaded opening therein which receives a threaded shaft 21 which projects upwardly through bridge plate 14 where it is provided with a crank handle 22 which may be used to rotate the threaded shaft 21, thereby raising and lowering the support plate 17 relative to the posts 12 and 13. The split quills 15, 16 are provided with sets of ears 23 interconnected by locking bolts 24 by means of which the quills may be clamped to the support posts when it is desired to immobilize the support plate 17.

A front plate 25 is suspended from support plate 17 by means of pairs of upper arms 26 and a corresponding pair of lower arms 27, one end of each arm being pivotally connected to the support plate 17 and its opposite end pivotally connected to the front plate 25 by means of brackets 28 and pivot pins 29, the pairs of arms defining a parallelogram linkage permitting vertical movement of the front plate 25 relative to the support plate 17 while maintaining the plates in parallel planes relative to each other.

In order to insure lateral stability of the pairs of arms 26, 27, the arms are interconnected by cross-braces 30 and by sets of laterally extending arms 31, 32, pivotally connected to support plate 17 at their outermost ends by means of additional brackets 28 and pivot pins 29, the inner ends of the laterally extending arms 31, 32 being fixedly secured to the arms 26, 27, respectively, adjacent their outermost ends. The laterally extending arms permit pivotal movement of the arms 26, 27 in a vertical plane, but restrain the arms against lateral movement.

Figure 2:
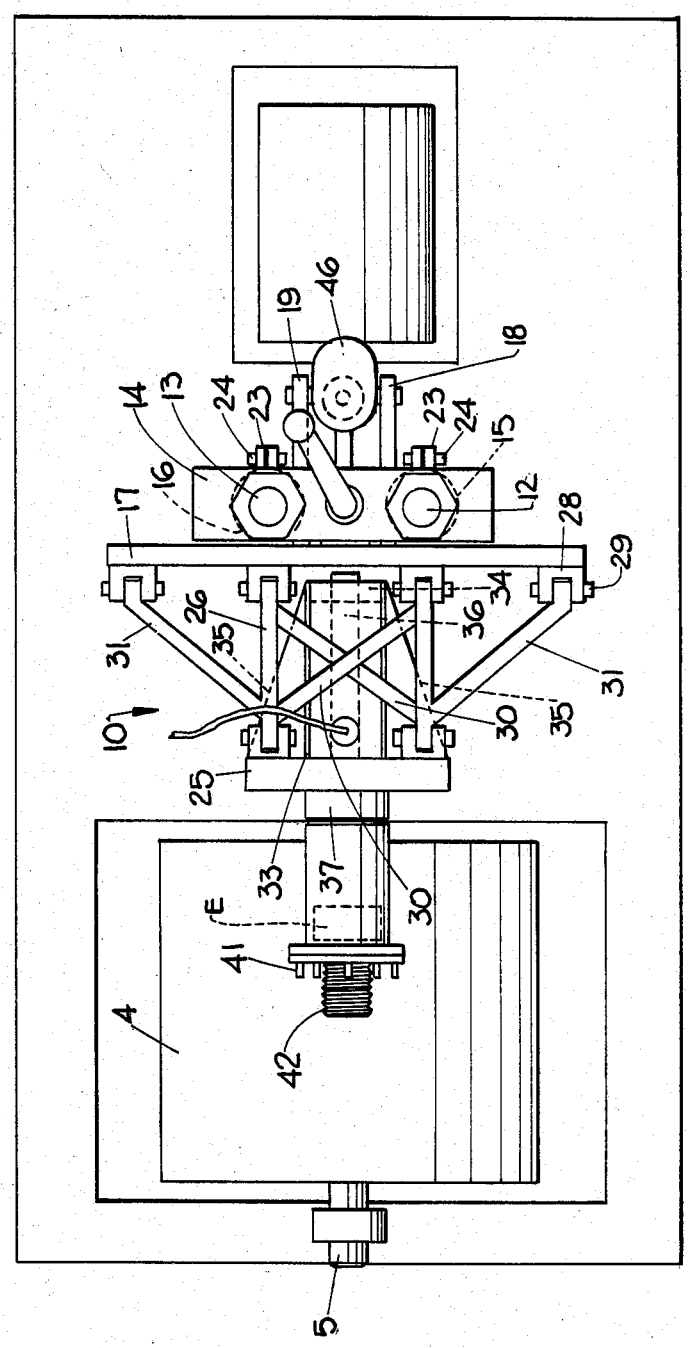
FIG. 2 is a top plan view of the tire balancing machine.
Figures 3, 4:
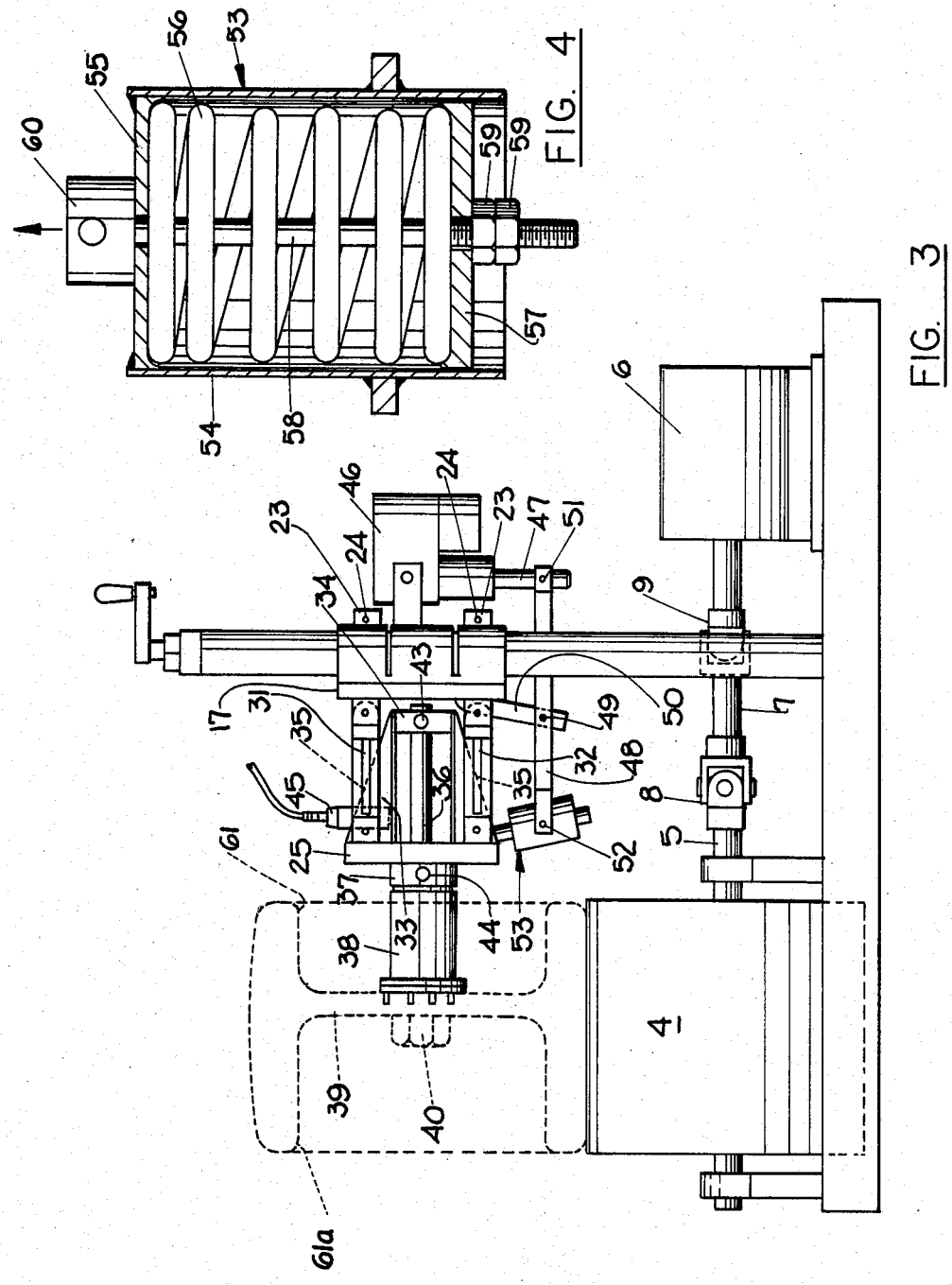
FIG. 3 is a side elevational view thereof.
FIG. 4 is an enlarged vertical sectional view of the spring assembly utilized to load the tire.

As best seen in FIGS. 2 and 3, the front plate 25 mounts a rearwardly projecting, open-sided axle box 33 which terminates rearwardly in a block 34. The axle box is supported by the front plate 25 and is reinforced by a series of reinforcing ribs 35. A non-rotatable wheel axle 36 is supported by the front plate 25, the rear block 34 and a front block 37 mounted on the outboard side of front plate 25. The forward end of the non-rotatable axis 36 projects outwardly beyond block 37 where it rotatably mounts a hub 38 to which the tire mounting wheel 39 is secured, as by means of a nut 40, the hub being provided with wheel positioning lugs 41 and a threaded nut receiving portion 42.

A pair of sensors 43, 44, such as piezo crystal load cells, are mounted on blocks 34 and 37, respectively, the sensors being horizontally disposed and positioned to sense horizontal signals generated by the lack of symmetry of the tire. The sensor 43 mounted on the rear block 34 will sense signals generated by the lack of symmetry on the outboard side of the tire, i.e., the outer half of the tire as viewed in FIGS. 1 and 3. The sensor 44 mounted on the front block 37 will sense the lack of symmetry on the inboard side of the tire, i.e., the side of the tire adjacent the front block 37. A third sensor 45 is mounted on the top of the axle box 33 where it will sense vertical asymmetrical forces generated at the footprint of the tire when in contact with the road wheel 4.

An encoder E, diagrammatically indicated in FIG. 2, is mounted within the hub 38, the encoder providing an origin signal during each revolution of the tire and a plurality of angular signals which are utilized to determine the locations at which the vibratory forces occur. The encoder is of known construction, such as a Trump-Ross (Gould) or a Teledyne Gurley.

The tire is loaded against the road wheel by means of an electromechanical acutator 46 which, as best seen in FIGS. 2 and 3, is pivotally mounted on the arms 18 and 19 which project rearwardly from support plate 17. The actuator 46 is also of known construction and may comprise a Duff-Norton electromechanical actuator having an axially displaceable power shaft 47. An actuating arm 48, best seen in FIGS. 1 and 3, is pivotally connected at 49 to a supporting arm 50 fixedly secured to support plate 17. A clevis 51 pivotally connects one end of actuating arm 48 to the power shaft 47 of actuator 46, and a clevis 52 connects the opposite end of the actuating arm to the spring assembly 53.

As seen in FIG. 4, the spring assembly 53 comprises a cylindrical housing 54 having a closed upper end 55 against which a helical spring 56 is seated. At its opposite end the spring 56 is contacted by an annular plate 57 secured to a rod 58 by means of nuts 59. The uppermost end of the rod 58 projects through an opening in the closed end 55 of the spring assembly where it terminates in a fitting 60 pivotally connected to the lower extremity of front plate 25 by means of a mounting ear and pivot pin (not shown).

OPERATION

The tire 11 is first mounted on the wheel 39 and inflated to the pressure at which the tire is designed to operate, whereupon the wheel is mounted on the hub 38. To adjust for a specific tire diameter, the locking bolts 24 on the split quills 15, 16 are loosened to permit the quills to be raised or lowered, the tire mounting system being raised or lowered by means of the threaded shaft 21 and crank handle 22, the objective being to position the tire so that it contacts the road wheel 4. The locking bolts 24 are then tightened, thereby fixing the position of the wheel axle 36 relative to the road wheel 4. Once the proper location of the axle relative to the road wheel has been established for a given size tire, no further adjustment is required to balance additional tires of the same size.

Once the tire has been mounted, the actuator 46 is energized to apply the desired load to the tire. When the actuator is energized, the power shaft 47 will move axially upwardly, thereby pivoting the actuator arm 48 about the pivot 49 in a counterclockwise direction, such movement, due to the clevis 52, causing the cylindrical housing 54 of the spring assembly 53 to move downwardly relative to annular plate 57 and rod 58, thereby compressing the helical spring 56 and hence exerting a loading force on the front plate 25 which, due to the parallelogram linkage, moves downwardly while maintaining the parallel relationship between the wheel axle 36 and the axle 5 of the road wheel. Such movement serves to load the tire against the road wheel, the applied load being selected to simulate the weight load which will be borne by the tire in normal use.

Following loading, the prime mover 6 is started and the road wheel and tire brought up to the desired speed at which the tire is to be balanced. For example, if the tire is being balanced for passenger car use to operate at a speed of 60 miles per hour, the road wheel will be rotated until that speed is reached. If the tire being balanced is intended for race car use, the speed will be much higher, for example 200 to 250 miles per hour.

If, in the course of bringing a racing tire up to the desired speed, excessive vibration occurs, lower speeds must be used until the tire vibration is reduced to an acceptable level, whereupon the tire will be processed for the lower speed and thereafter progressively processed until the desired higher speed is reached.

THE BALANCING PROCEDURE

Initially, the balancing of a tire of a given size is conducted in three stages, which are as follows:

First stage—The tire in the "as is" condition, i.e., without weights, is brought to the desired speed while under predetermined load and readings of the sensors 43, 44 and 45 are taken along with their angular locations from the encoder E and recorded in a computer. The machine is then stopped.

Second stage—A known trial weight is then applied to the wheel rim on the inner side of the tire at a specific location, preferably in alignment with the zero degrees or origin signal from the encoder, such weight being indicated at 61 in FIG. 3. The weight should be large enough to be effective, but not too large to damage the machine. The applied weight may be from ½ to 5 grams, depending upon the size of the tire. The machine is started and run at the same speed and under the same load as the first stage and the output of the sensors 43, 44 and 45 recorded along with their angular locations, whereupon the machine is again stopped.

Third stage—The trial weight is removed from the rim and placed at the same angular position but on the opposite side of the tire, as indicated at 61a in FIG. 3. The machine is again started and run at the same speed and load and new readings are recorded from the sensors 43, 44 and 45 along with their angular locations, whereupon the machine is again stopped.

The recorded readings from the three stages are analyzed by the computer, which is programmed to compare the data and calculate the correct amounts and proper locations to place needed corrective weights on both sides of the wheel rims to counteract the asymmetrical forces generated at the footprint of the tire. In other words, the computer will compare the magnitude and angular location of the asymmetrical forces generated by the tire during the first stage, in which the tire is in "as is" condition, with the forces generated by the tire when a trial weight of known magnitude is applied to a fixed location first on one side of the tire and then on the other side of the tire, and from these readings will calculate and display the correct amounts and proper locations to place needed corrective weights on both sides of the rim to offset the asymmetrical forces generated by the tire.

Once the computer has in storage the data generated by a given size tire and wheel, additional tires of the same diameter mounted on similar wheels can be processed by recording only the data taken during the first stage, namely, when the tire is tested in the "as is" condition. By utilizing the first stage or "as is" data, the computer will be used to determine the correct weight and proper location of the weights on both sides of the rim without the need for additional runs, i.e., without stages two and three, providing the speed of rotation of the tire and the load are the same. In other words, once the effect of the trial weights added during the second and third stages is known for a tire of a given size, such data may be utilized and compared with the "as is" data taken for the additional tires, and the differences calculated to give the amounts and locations of the weights necessary to compensate for and overcome the asymmetrical forces generated by the additional tires.

Where tires of different sizes are to be balanced, each different size tire will be analyzed in the three stages set forth above, but thereafter additional tires of the same size may be processed by subjecting them only to the first stage operation followed by a computer analysis and comparison of the "as is" data with the previously collected second and third stage data for tires of the same size.

Once the processing of a given tire is completed, the vertical sensor 45 may be utilized to determine the effectiveness of the process on the rolling radius, the net result being to offset the vertical vibratory reactions which occur within the tire when operated at a given speed and under a given load, thereby balancing the tire under in-use conditions rather than as if it were freely rotating in space, as has heretofore been the practice.

What is claimed is:

1. A tire balancing machine comprising a supporting frame, an axle box mounted on said frame, a wheel axle projecting outwardly from said axle box, means for rotatably mounting the tire and wheel on said wheel axle, a road wheel spaced from said wheel axle with its axis of rotation parallel to the longitudinal axis of said wheel axle, drive means for rotating said road wheel at a selected speed of rotation equivalent to the speed of rotation for which the tire is being balanced, means mounting said axle box for pivotal movement relative to said road wheel while maintaining the longitudinal axis of said wheel axle parallel to the axis of rotation of said road wheel, means for applying a predetermined resilient load to said wheel axle to load a tire mounted on said wheel axle against said road wheel, sensor means mounted on said axle box, said sensor means being positioned to measure the horizontal and vertical dynamic forces generated at the footprint of the tire as it is rotated while loaded against the road wheel, and encoder means to measure the angular locations of said forces during each revolution of the tire.

2. The tire balancing machine claimed in claim 1 wherein the means mounting said axle box for pivotal movement relative to said road wheel comprises a parallelogram linkage pivotally connected to said axle box and to a support plate mounted on said supporting frame.

3. The tire balancing machine claimed in claim 2 including adjustment means mounting said support plate for movement relative to said road wheel, whereby to adjust the distance between said road wheel and said wheel axis to accommodate tires of different sizes.

4. The tire balancing machine claimed in claim 3 wherein said support plate is slidably mounted on a pair of support posts secured to said supporting frame.

5. The tire balancing machine claimed in claim 4 wherein said support plate is mounted on said support posts by means of split quills having releasable locking means for fixedly securing the quills to said support posts.

6. The tire balancing machine claimed in claim 1 wherein said wheel axle is fixedly secured to said axle box, and wherein the means for rotatably mounting a tire on said wheel axle comprises a hub rotatably mounted on said wheel axle.

7. The tire balancing machine claimed in claim 2 wherein the means mounting said axle box for pivotal movement relative to said road wheel comprises a parallelogram linkage mounted for pivotal movement toward and away from the axis of rotation of said road wheel, and rigidifying means holding said parallelogram linkage against lateral movement.

8. The tire balancing machine claimed in claim 7 wherein said axle box has an axle block at each end thereof to which said wheel axle is fixedly secured, and wherein said sensor means comprises a load cell mounted on each of said axle blocks, said load cells being positioned to measure the horizontal forces generated at the footprint of the tire.

9. The tire balancing machine claimed in claim 8 wherein said sensor means includes a third load cell mounted on said axle box at right angles to the load cells mounted on said axle blocks.

10. The tire balancing machine claimed in claim 1 wherein the means for applying a predetermined resilient load to said wheel axle comprises a spring assembly operatively connected to said wheel axle, and actuator means connected to said spring assembly for varying the load applied to said spring assembly.

11. The tire balancing machine claimed in claim 10 wherein said spring assembly comprises a cylindrical housing having a closed end, a helical spring contained in said housing and seated against said closed end, a rod extending centrally through said casing and said helical spring and projecting outwardly through an opening in the closed end of said casing, the outwardly projecting end of said rod being pivotally connected to said axle box, an annular plate secured to said rod and seated against the opposite end of said helical spring, said actuator means being connected to said housing so as to displace said housing axially relative to said helical spring.

12. The tire balancing machine claimed in claim 11 wherein said actuator means comprises an actuating arm piovtally mounted intermediate its opposite ends to a fixed support, first clevis means connecting one end of said actuating arm to the cylindrical housing of said spring assembly, and second clevis means connecting the opposite end of said actuating arm to the power shaft of an electromechanical actuator.

13. A method of balancing an inflatable rubber tire/wheel assembly which comprises the steps of providing a tire to be balanced mounted on a wheel with the tire inflated to normal operating tire pressure, rotatably mounting the tire/wheel assembly on a non-rotatable shaft, resiliently loading the tire against a rotatable road wheel to simulate the weight load which will be borne by the tire in use, rotating the tire at a selected speed at which the tire is intended to be driven in use, measuring the magnitude and angular location of the horizontal and vertical dynamic forces generated at the footprint of the tire as it is rotated while loaded against the road wheel by means of signals derived from the non-rotatable shaft, and applying counteracting weights to both sides of the rim of the wheel in accordance with the magnitude and angular location of the measured forces.

14. The method claimed in claim 13 wherein the magnitude and angular location of the horizontal and vertical dynamic forces are measured in a first stage with the tire free from added weights, wherein in a second stage a trial weight of predetermined magnitude is added to one side of the wheel rim at a selected angular position and the magnitude and location of the horizontal and vertical dynamic forces generated at the footprint of the tire measured while rotating the tire at the same speed and under the same resilient load, removing the added trial weight and, in a third stage, adding a trial weight of the same magnitude to the opposite side of the wheel rim at the same angular position and measuring the magnitude and angular location of the horizontal and vertical forces generated at the footprint of the tire while rotating the tire at the same speed and under the same resilient load as in the preceding stages, and applying corrective weights to both sides of the wheel rim in accordance with the magnitudes and locations of the measured forces taken during each of the three stages.

15. The method claimed in claim 14 including the balancing of additional tires of the same size as the first balanced tire while mounted on wheels which are the same as the wheel on which the first balanced tire was mounted, by rotating each additional tire/wheel assembly at the same speed of rotation and under the same resilient load as the first balanced tire, measuring the magnitude and angular location of the horizontal and vertical dynamic forces generated at the footprint of the additional tire as the tire is rotated without added weights, and balancing the additional tire by applying corrective weights to both sides of its wheel rim in accordance with the magnitude and location of the forces generated by the additional tire without weights compared with the magnitude and location of the forces generated by the first corrected tire with known trial weights added, whereby the additional tires are balanced without subjecting the additional tires to the second and third stage measurements.

* * * * *